(12) United States Patent
Boerensen et al.

(10) Patent No.: US 10,690,029 B2
(45) Date of Patent: Jun. 23, 2020

(54) SYSTEM AND METHOD FOR EXHAUST GAS AFTERTREATMENT WITH LEAN NOX TRAP AND EXHAUST GAS RECIRCULATION

(71) Applicant: Ford Global Technologies, LLC, Dearborn, MI (US)

(72) Inventors: Christoph Boerensen, Aachen (DE); Dirk Roemer, Cologne (DE); Frank Linzen, Aachen (DE); Brendan Carberry, Aachen (DE); Felix Goebel, Aachen (DE); Evgeny Smirnov, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 15/884,208

(22) Filed: Jan. 30, 2018

(65) Prior Publication Data

US 2018/0216510 A1 Aug. 2, 2018

(30) Foreign Application Priority Data

Jan. 30, 2017 (DE) .................. 10 2017 201 401

(51) Int. Cl.
*F01N 3/08* (2006.01)
*F02D 41/00* (2006.01)
(Continued)

(52) U.S. Cl.
CPC .......... *F01N 3/0814* (2013.01); *F01N 3/035* (2013.01); *F01N 3/0821* (2013.01);
(Continued)

(58) Field of Classification Search
CPC .... F01N 3/2033; F01N 3/0814; F01N 3/0821; F01N 3/0842; F01N 13/009;
(Continued)

(56) References Cited

U.S. PATENT DOCUMENTS

| | | | |
|---|---|---|---|
| 7,512,479 B1 * | 3/2009 | Wang ................. | F02D 41/0002 123/568.21 |
| 8,122,706 B2 * | 2/2012 | Yoshida ............. | B01D 53/9409 60/285 |

(Continued)

FOREIGN PATENT DOCUMENTS

| | | | |
|---|---|---|---|
| DE | 102004018393 A1 * | 11/2005 | ............. F01N 3/025 |
| DE | 102013212802 A1 | 1/2015 | |

(Continued)

*Primary Examiner* — Laert Dounis
(74) *Attorney, Agent, or Firm* — Geoffrey Brumbaugh; McCoy Russell LLP (57) ABSTRACT

An arrangement of an internal combustion engine with at least one first and one second nitrogen oxide storage catalytic converter is provided, wherein the first nitrogen oxide storage catalytic converter is arranged within a low-pressure exhaust gas recirculation circuit. A method for operating the arrangement is furthermore provided, wherein the nitrogen oxide storage catalytic converters can be used for the production of ammonia under operating conditions with a high load by providing rich exhaust gas conditions.

18 Claims, 4 Drawing Sheets

(51) Int. Cl.
*F02D 41/02* (2006.01)
*F01N 3/20* (2006.01)
*F01N 9/00* (2006.01)
*F01N 13/00* (2010.01)
*F02M 26/15* (2016.01)
*F02M 26/06* (2016.01)
*F01N 3/035* (2006.01)
*F02D 41/40* (2006.01)

(52) U.S. Cl.
CPC ......... *F01N 3/0842* (2013.01); *F01N 3/2033* (2013.01); *F01N 3/2066* (2013.01); *F01N 3/2073* (2013.01); *F01N 9/00* (2013.01); *F01N 13/0093* (2014.06); *F02D 41/0055* (2013.01); *F02D 41/0077* (2013.01); *F02D 41/0275* (2013.01); *F02M 26/06* (2016.02); *F02M 26/15* (2016.02); *F01N 2430/06* (2013.01); *F01N 2610/03* (2013.01); *F02D 41/405* (2013.01); *Y02T 10/24* (2013.01); *Y02T 10/26* (2013.01); *Y02T 10/47* (2013.01)

(58) Field of Classification Search
CPC ...... F01N 13/0093; F01N 3/025–0256; F02M 26/06; F02M 26/14; F02M 26/15
See application file for complete search history.

(56) References Cited

U.S. PATENT DOCUMENTS

| | | | |
|---|---|---|---|
| 9,482,128 | B2 | 11/2016 | Eckhoff et al. |
| 2003/0167756 | A1* | 9/2003 | Szymkowicz .......... F01N 3/023 60/289 |
| 2006/0248874 | A1* | 11/2006 | Goersmann ........ B01D 53/9422 60/274 |
| 2010/0037596 | A1* | 2/2010 | Toshioka ........... B01D 53/9418 60/286 |
| 2017/0175607 | A1 | 6/2017 | De Smet et al. |
| 2017/0363029 | A1 | 12/2017 | Boerensen et al. |

FOREIGN PATENT DOCUMENTS

| | | |
|---|---|---|
| DE | 102015206838 A1 | 10/2016 |
| DE | 102016210897 A1 | 12/2017 |
| WO | WO-2010079619 A1 * 7/2010 | ........... F01N 3/0814 |

\* cited by examiner

SYSTEM AND METHOD FOR EXHAUST GAS AFTERTREATMENT WITH LEAN NOX TRAP AND EXHAUST GAS RECIRCULATION

CROSS REFERENCE TO RELATED APPLICATION

The present application claims priority to German Patent Application No. 102017201401.6, filed Jan. 30, 2017. The entire contents of the above-referenced application are hereby incorporated by reference in its entirety for all purposes.

FIELD

The present description relates generally to an exhaust gas aftertreatment system comprising exhaust gas recirculation (EGR) passages and ammonia storage devices.

BACKGROUND/SUMMARY

Nitrogen oxide storage catalytic converters (also referred to as NOx storage cats or lean NOx traps, LNT) are used for the temporary adsorption of nitrogen oxides from the exhaust gas of internal combustion engines. In addition, they perform the functions of oxidative aftertreatment of carbon monoxide (CO) and hydrocarbons (HC). Nitrogen oxides which form during lean-burn operation of an internal combustion engine can be stored in an LNT; for this purpose, the LNT oxidizes the nitrogen monoxide (NO) contained in the lean exhaust gas to form nitrogen dioxide ($NO_2$), and subsequently stores this in the form of nitrates. Examples of adsorbents that are used in the coating of the LNT are barium oxide and/or other oxides.

Once the storage capacity of the LNT is exhausted, the LNT must be regenerated. In a regeneration event (purge), rich, substoichiometric exhaust gas conditions are provided, e.g. by operating the internal combustion engine with a corresponding fuel/air mixture; during this process, the stored nitrogen oxides are desorbed again and are reduced to nitrogen over catalytically active components of the LNT with the aid of the components in the rich exhaust gas (CO, HC). In addition to a purge brought about solely for regeneration, the LNT is, of course, also regenerated when the exhaust gas becomes substoichiometric by reason of a power demand of the internal combustion engine, for example.

In the LNT, the stored nitrates furthermore react with molecular hydrogen, which is produced by incomplete combustion of the fuel and also by reactions in the LNT under rich exhaust gas conditions, as a result of which ammonia is also produced during regeneration. This ammonia can be utilized by storing it downstream in a catalytic converter for selective catalytic reduction (SCR). The stored ammonia is used in the SCR to reduce nitrogen oxides to nitrogen under lean exhaust gas conditions. To enable the SCR catalytic converter to have a higher storage capacity, it is advantageous to install it sufficiently far downstream to ensure that optimum operating temperatures are obtained for it. The corresponding temperature range is a function of the specific SCR coating and is known to a person skilled in the art.

Among the factors which limit the storage capacity of an LNT is the temperature of the exhaust gas. Modern LNTs can store nitrogen oxides with varying efficiency in a temperature range of 250-550° C. Moreover, the storage capacity can be restricted by the space velocity of the exhaust gas. When the internal combustion engine is operated under a high load, e.g. during an acceleration event, high exhaust gas temperatures and mass flows are achieved, and these can exceed the technological limits of the LNT, severely reducing the nitrogen oxide storage capacity of the LNT owing to the gas temperature and space velocity. Under these conditions, nitrogen oxides cannot be stored in the LNT. It is possible to counteract the escape of nitrogen oxides under high loads by switching between different combustion modes, depending on the engine load, depending on the saturation of catalysts, and depending on the exhaust gas temperature. These modes include states involving lean exhaust gas and a state involving rich, substoichiometric exhaust gas (see applications DE 10 2016 210 897.2 and DE 10 2016 210 899.9).

However, the inventors herein have recognized an issue with the above approach. In exhaust systems with two LNTs, when the downstream LNT demands purge, excess ammonia may be generated in the upstream LNT. Further, when post-injection of fuel to the engine is used to generate the rich exhaust for purge of the downstream LNT, more fuel than actually necessary for carrying out the purge may be supplied, in part because the downstream LNT may flow exhaust gas at a lower mass flow rate than the upstream LNT.

Accordingly, the inventors herein provide systems and methods to at least partly address the above issues. In one example, an arrangement for a vehicle including an internal combustion engine with an exhaust tract includes a low-pressure exhaust-gas recirculation line branching off from the exhaust tract downstream of a turbine and an exhaust gas aftertreatment system arranged in the exhaust tract. The exhaust gas aftertreatment system includes a first nitrogen oxide storage catalytic converter (also referred to as a first LNT), a second nitrogen oxide storage catalytic converter arranged downstream of the first nitrogen oxide storage catalytic converter (also referred to as a second LNT), a particle filter arranged downstream of the first nitrogen oxide storage catalytic converter and upstream of the second nitrogen oxide storage catalytic converter, and a first feed device for introducing fuel into the exhaust tract and arranged downstream of the branching off of the exhaust gas recirculation line and upstream of the second nitrogen oxide storage catalytic converter.

A first aspect of the disclosure relates to an arrangement of an internal combustion engine with an exhaust tract, from which at least one low-pressure exhaust gas recirculation line branches off and in which an exhaust gas aftertreatment system is arranged. The exhaust gas aftertreatment system comprises at least one first nitrogen oxide storage catalytic converter (LNT), at least one second LNT, which is arranged downstream of the first LNT, at least one particle filter, which is arranged downstream of the first LNT, and at least one first feed device for introducing fuel into the exhaust tract, which device is arranged downstream of the branching off of the exhaust gas recirculation line and upstream of the second LNT.

The arrangement according to the disclosure is advantageous because it allows external fuel injection upstream of the second LNT. As a result, it is sufficient for rich exhaust gas to be made available for regeneration or a substoichiometric mode by post-injection only for the first LNT, while the exhaust gas for regeneration or a sub stoichiometric mode of the second LNT is provided by external introduction of fuel into the exhaust tract. Therefore, a reduced quantity of additionally injected fuel (in comparison with operation without external fuel injection) is required for the first LNT. It is thereby advantageously ensured that less fuel is carried into the engine oil, which is less severely diluted as a result, leading to less severe impairment of the lubricating properties of the oil. Furthermore, restrictions in respect of the material temperature limits of a turbocharger turbine arranged in the exhaust tract are of lesser weight if the conditions for a substoichiometric mode are brought about by introducing fuel into the exhaust tract. In addition, less fuel is required for the substoichiometric mode or regeneration of the second LNT than in the case of the first LNT since the exhaust gas mass flow through the second LNT is lower than that through the first LNT. Moreover, the first LNT can remain in the lean exhaust gas during a substoichiometric mode or regeneration of the second LNT. Furthermore, it is not necessary to reduce the oxygen quantity stored in the first LNT in order to achieve rich exhaust gas conditions in the second LNT, and this likewise has a favorable effect on fuel consumption. Moreover, the ammonia which can form in the first LNT under conditions of high load and rich exhaust gas can advantageously be used for further reduction of the nitrogen oxides in the second LNT.

In this case, rich-mixture operation of the internal combustion engine may be triggered, especially under conditions with a high load and high exhaust gas temperatures resulting therefrom. Under these conditions, the first LNT no longer operates as a storage catalytic converter but immediately converts the nitrogen oxides present in the exhaust gas to nitrogen with the aid of the reducing agents (carbon monoxide and hydrocarbons) which are likewise present in the exhaust gas. In this way, nitrogen oxides are advantageously removed from the exhaust gas emerging from the internal combustion engine under high-load conditions. Moreover, the level of enrichment in the exhaust gas may be adjusted so that, under these conditions, ammonia is formed over the catalytically active components of the first LNT by the reaction of hydrogen with nitrogen oxides as soon as previously stored oxygen has been removed from the first LNT. In an example, this ammonia can be used for further, downstream reduction of the nitrogen oxides with the aid of the second LNT.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

According to embodiments disclosed herein, an arrangement for a vehicle includes an internal combustion engine with an exhaust tract. The arrangement includes a low-pressure exhaust-gas recirculation line branching off from the exhaust tract downstream of a turbine and an exhaust gas aftertreatment system arranged in the exhaust tract. The exhaust gas aftertreatment system includes a first nitrogen oxide storage catalytic converter (also referred to as a first LNT), a second nitrogen oxide storage catalytic converter (LNT), arranged downstream of the first nitrogen oxide storage catalytic converter (also referred to as a second LNT), a particle filter arranged downstream of the first nitrogen oxide storage catalytic converter and upstream of the second nitrogen oxide storage catalytic converter, and a first feed device for introducing fuel into the exhaust tract and arranged downstream of the branching off of the exhaust gas recirculation line and upstream of the second nitrogen oxide storage catalytic converter. To detect the operating conditions and control the operating modes, the arrangement according to the disclosure may include a control device.

The arrangement according to the disclosure may include at least one further, second feed device for introducing fuel into the exhaust tract, which device is arranged upstream of the first LNT. If the arrangement additionally has a high-pressure exhaust gas recirculation system, regeneration or a substoichiometric mode can be performed with the aid of external introduction of a reducing agent, e.g., by introducing fuel into the exhaust tract, during operation of the arrangement using high-pressure exhaust gas recirculation, which can be worthwhile under cold starting conditions or at low load, for example. This advantageously avoids a situation where hydrocarbons in the fuel can lead to sooting of the high-pressure exhaust gas recirculation system, especially of a cooler arranged in an exhaust gas recirculation line of the high-pressure exhaust gas recirculation system.

The second nitrogen oxide storage catalytic converter of the arrangement according to the disclosure may have a catalytically active coating which is different from the coating of the first nitrogen oxide storage catalytic converter. In this way, the catalytically active coating of the second LNT may be optimized for operation in the substoichiometric mode. As a particular preference here, the catalytically active coating of the second nitrogen oxide storage catalytic converter is optimized relative to the coating of the first nitrogen oxide storage catalytic converter for nitrogen oxide conversion at high temperatures. For example, the coating of the second LNT may include less oxygen storage material than the coating of the first LNT.

The first and/or the second feed device for introducing fuel into the exhaust tract may comprise a fuel injector. The fuel injector can be designed as a "vaporizer" or can be included in such a device.

A catalytic converter for selective catalytic reduction (SCR catalytic converter) may be arranged downstream of the second nitrogen oxide storage catalytic converter. If ammonia is formed in the LNTs, especially in the second LNT, during regeneration or a substoichiometric mode, the ammonia may be used by the SCR catalytic converter arranged downstream to reduce NOx or the ammonia may be stored.

The particle filter furthermore may have a catalytic coating. As a particular preference, the coating of the particle filter is configured for selective catalytic reduction. It is thereby advantageously possible to store in the particle filter ammonia which is formed in the first LNT in the substoichiometric mode, and to use the ammonia to reduce nitrogen oxides.

The arrangement according to the disclosure as described herein may be installed in a motor vehicle.

An aspect of the disclosure relates to a method for operating an arrangement according to the disclosure. The method may include operating the internal combustion engine, with the result that exhaust gas is passed through the exhaust tract, at a low or medium load. The method may include changing to an operating state of the internal combustion engine with a high load. Upon changing to the high load, the method may include starting a rich combustion mode of the internal combustion engine, recirculating exhaust gas through the exhaust gas recirculation line of the low-pressure exhaust gas recirculation system, introducing fuel by the first feed device for introducing fuel into the exhaust tract upstream of the second nitrogen oxide storage catalytic converter, and changing to an operating state of the internal combustion engine with a low load and a lean combustion mode.

The method according to the disclosure may allow for the emission of nitrogen oxides to be controlled under all operating conditions of the internal combustion engine.

Starting a rich combustion mode is familiar to a person skilled in the art and is accomplished, for example, by post-injection in the internal combustion engine.

Figure 1:
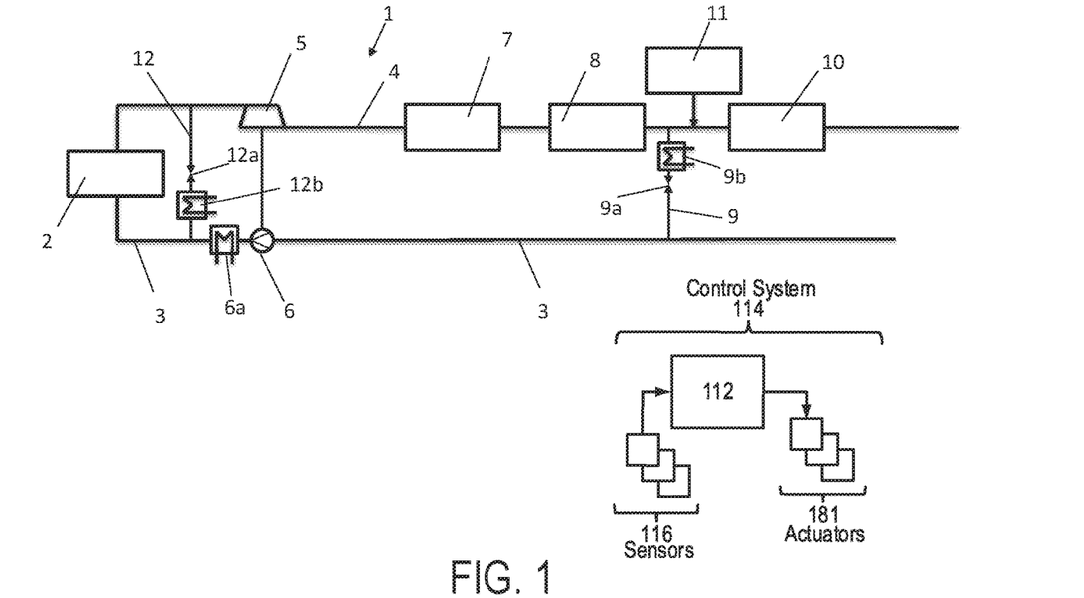
FIG. 1 is a schematic illustration of an embodiment of the arrangement according to the disclosure.

An arrangement 1 according to the disclosure has, in an embodiment as per the illustration of FIG. 1, an internal combustion engine 2. The internal combustion engine 2 may be an auto-ignition or applied-ignition internal combustion engine. The internal combustion engine has at least one cylinder (not shown), but can also have a different number of cylinders, e.g. two, three, four or more cylinders.

The internal combustion engine 2 is connected to an intake tract 3 and to an exhaust tract 4. A turbine 5 of a turbocharger is arranged in the exhaust tract 4. The turbine 5 is connected by a shaft to a compressor 6, which is arranged in the intake tract 3. A cooler device 6a is arranged in the intake tract 4 downstream of the compressor. Alternatively, it is however also possible for no turbocharger, and thus also no turbine and no compressor, to be provided.

A first nitrogen oxide storage catalytic converter (LNT) 7 is arranged in the exhaust tract 4 downstream of the turbine 5. A particle filter 8 is arranged downstream of the first LNT 7. If the internal combustion engine 2 is an auto-ignition internal combustion engine, the particle filter 8 is a diesel particle filter (DPF). Ideally, the particle filter 8 has, at least in part, a catalytically active coating. As a particular preference here, the catalytically active coating is configured for selective catalytic reduction. This enables ammonia, which is produced in the first LNT 7 during a substoichiometric mode, to be stored in the particle filter 8 and used to reduce nitrogen oxides in the exhaust gas.

A low-pressure exhaust gas recirculation line 9 of a low-pressure exhaust gas recirculation system (LP-EGR) branches off from the exhaust tract 4 downstream of the particle filter 8. This exhaust gas recirculation line 9 connects the exhaust tract 4 fluidically to the intake tract 3. A first exhaust gas recirculation valve 9a, which allows control of the exhaust gas mass flow from the exhaust tract 4 into the intake tract 3, is arranged in the exhaust gas recirculation line 9. A first exhaust gas recirculation cooler 9b is furthermore arranged in the exhaust gas recirculation line 9. The exhaust gas recirculation cooler 9b can have a bypass.

A second LNT 10 is arranged downstream of the branching off of the exhaust gas recirculation line 9. The second LNT 10 preferably has a different catalytically active coating from the first LNT 7. The catalytically active coating of the first LNT 7 is that of a conventional LNT. This means that the coating is configured for absorption and conversion of nitrogen oxides in the case of cold starting and moderate temperatures, wherein noble metals (typically Pt, Pd or Rd), oxygen-storing materials such as Cer, and barium compounds are used for the coating. The catalytically active coating of the second LNT 10 may be configured in a different way. Since the first LNT 7 assumes the functions of cold starting emissions control, the second LNT 10 may be configured for NOx conversion at high temperatures. This also provides the possibility of reducing the quantity of oxygen-storing components, which means that the initial need to reduce stored oxygen during a regeneration is lowered, which means, in turn, that less fuel also has to be used. As an option, the second LNT 10 may also be configured with a zoned coating, in which a zone with an oxygen storage capacity is applied only at the end so as to prevent reducing agents breaking through.

A first feed device for fuel 11 is arranged upstream of the second LNT 10. The first feed device 11 is designed for introducing fuel into the exhaust tract 4 upstream of the second LNT 10. The feed device 11 is a fuel injector or a vaporizer, for example.

An exhaust gas recirculation line 12 of a high-pressure exhaust gas recirculation system branches off from the exhaust tract 4 upstream of the turbine 5, said line connecting the exhaust tract 4 fluidically to the intake tract 3. A second exhaust gas recirculation valve 12a and a second exhaust gas recirculation cooler 12b are arranged in the exhaust gas recirculation line 12. The exhaust gas recirculation cooler 12b can have a bypass.

Furthermore, the arrangement 1 has sensors, e.g., nitrogen oxide, ammonia, lambda and/or temperature sensors, which may be arranged at any desired points in the arrangement 1. The sensors are connected to a control device, described in more detail below. Furthermore, the arrangement 1 may also have, for example, at least one device for introducing reducing agent, in particular an aqueous urea solution, into the exhaust tract 4. Furthermore, a throttle valve may be arranged in the downstream end region of the exhaust tract 4. Via the control device, the operating modes, the quantities of fuel introduced and of aqueous urea solution as well as the settings of valves and cooler devices are controlled. The control device is furthermore connected to the internal combustion engine 2 in order to issue control commands relating to rich or lean operation based on evaluation of the measured values.

Control system 114 includes a controller 112 and is shown receiving information from a plurality of sensors 116 (various examples of which are described herein) and sending control signals to a plurality of actuators 181 (various examples of which are described herein). As one example, sensors 116 may include oxygen sensors in the exhaust tract, EGR lines, intake tract, and/or other locations. Other sensors such as pressure, temperature, air/fuel ratio, and composition sensors may be coupled to various locations in the arrangement. As another example, the actuators may include the first feed device 11, fuel injectors of engine 2, EGR valves, and/or other actuators. The controller may receive input data from the various sensors, process the input data, and trigger the actuators in response to the processed input data based on instruction or code programmed therein corresponding to one or more routines.

Figure 2:
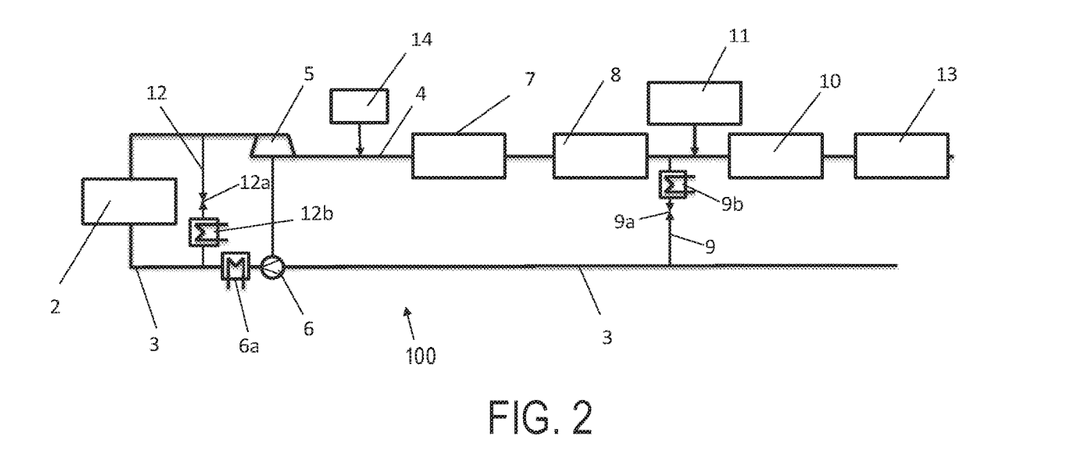
FIG. 2 is a schematic illustration of another embodiment of the arrangement according to the disclosure.

In another embodiment of an arrangement 100 as per the illustration in FIG. 2, a catalytic converter for selective catalytic reduction (SCR catalytic converter) 13 is arranged downstream of the second LNT 10. Furthermore, the embodiment illustrated in FIG. 2 has a second feed device for fuel 14, which is arranged upstream of the first LNT 7. The second feed device 14 may be of the same design as the first feed device 11. While not shown in FIG. 2, arrangement 100 includes a control system similar to that described above with respect to FIG. 1. The second feed device 14 may be an example of an actuator controlled by the control system, as described above.

Figure 3:
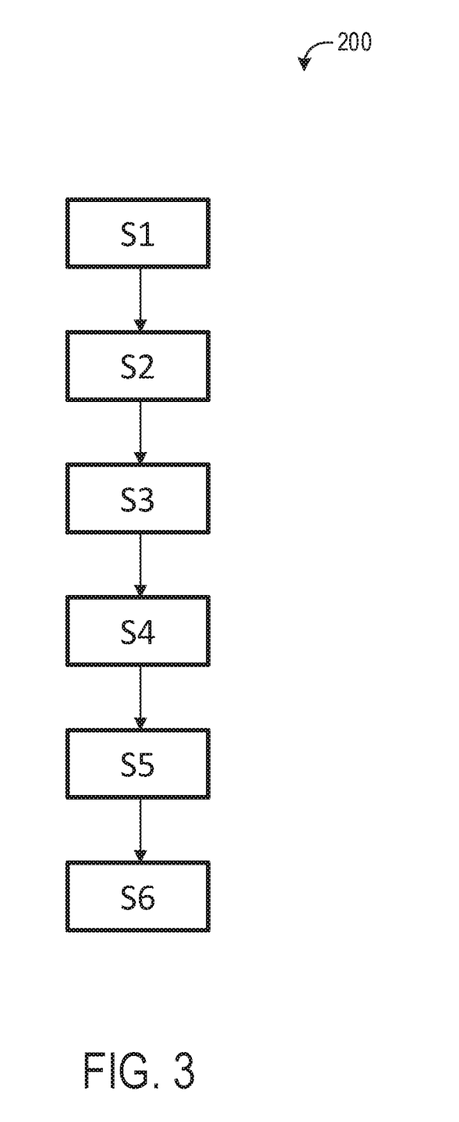
FIG. 3 shows a flow diagram of an embodiment of the method according to the disclosure.

In an embodiment of the method as per the illustration in FIG. 3, in a first step S1, the internal combustion engine 2 is operated, with the result that exhaust gas is passed through the exhaust tract. In this case, the load is low to moderate. Here, the internal combustion engine 2 is operated in a lean combustion mode, and therefore lean exhaust gas is produced. Nitrogen oxides formed during this process are stored in the first LNT 7 and the second LNT 10, and are resorbed and reduced with rich exhaust gas in short phases. Rich exhaust gas is provided, for example, by post-injection into the internal combustion engine 2, recirculating exhaust gas through the exhaust gas recirculation line 9, and/or introducing fuel into the exhaust tract 4 through the first and/or second feed device 11, 14.

In a second step S2, there is a changeover to an operating state of the internal combustion engine 2 with a high load. This takes place, for example, in the context of an acceleration demand, in which the gas pedal is depressed fully or to a significantly greater extent than during steady driving. In this case, the exhaust gas is produced at a temperature which is so far above that in normal operation that the first LNT 7 can no longer store nitrogen oxides effectively. For example, the temperatures at a high load can rise quickly to above 550° C. in the region of the first LNT 7, preventing efficient storage.

In a third step S3, a rich combustion mode of the internal combustion engine 2 is started. This is preferably accomplished by post-injection of fuel into the internal combustion engine. In a fourth step S4, exhaust gas is passed through the exhaust gas recirculation line 9. The quantity of exhaust gas recirculated is regulated by adjusting the exhaust gas recirculation valve 9a.

In the case of prolonged high load demands, corresponding temperatures are also reached in the region of the second LNT 10. In order to also operate the second LNT 10 with rich exhaust gas in operation under high load, fuel is introduced into the exhaust tract 4 by the first feed device 11 in a fifth step S5. Ammonia which is formed in the second LNT 10 and escapes from said LNT during this process may be stored in the SCR catalytic converter 13, which is illustrated in the arrangement as per FIG. 2, and is used at a later stage for reduction of nitrogen oxides. In certain situations, e.g. when the exhaust gas temperature from the internal combustion engine rises to a level higher than that compatible with the material of the turbine 5, it is also possible to pass fuel into the exhaust tract by the second feed device 14 instead of performing post-injection into the internal combustion engine 2.

Rich operation may be maintained for the duration of the high load. In a sixth step S6, the internal combustion engine 2 is once again operated with a low load, and a lean combustion mode is set. However, it is also possible for rich operation to be interrupted, if, for example, a larger quantity of ammonia than can be stored is formed during rich operation. In this case, lean operation is carried out for a certain period of time, in which the previously stored ammonia is used to reduce the nitrogen oxides. The two operating modes may be used in alternation for as long as required by high temperatures and space velocities.

The systems and methods described herein may provide many advantages. In one example, fuel dilution of engine oil may be reduced. In the post-injection of fuel in the cylinder, a part of the fuel is introduced into the engine oil, which leads to the dilution of the oil and deterioration of the lubricating properties. This effect may be reduced or avoided with respect to the second LNT for normal purges and for the rich mode.

As another example, the rich mode is introduced at high engine load, with the material temperature limits of various components, e.g., of the turbocharger, being complied with. This may result in restrictions on the duration that the vehicle may be driven with the engine operating in the rich mode. This restriction may be lessened or avoided if rich conditions are established by the fuel path (e.g., device 11) for the second LNT via the external feed of reductant before the second LNT.

As a further example, the present disclosure provides for a reduction of fuel quantity. With the same reduction in the air path, less fuel is required for the rich operation or the purge of the second LNT than for the first LNT, because the second LNT experiences a lower mass flow than the first LNT (e.g., due to the flowing of LP-EGR and/or other factors). In addition, the first LNT may continue to flow lean exhaust during rich operation or purges. Further, the amount of oxygen stored on the first LNT may not be reduced to achieve rich conditions on the second LNT, which is also favorable for low fuel consumption.

In the case of operation with HP-EGR, e.g., under cold start or low load conditions, purge or rich mode may be carried out with the aid of external reductant introduction without hydrocarbons causing the HP-EGR system to be exposed to soot. Additionally, the catalytic coating of the second LNT may be optimized for rich mode operation and different from the first coating of the first LNT. Thus, it is advantageous if the second LNT contains little oxygen storage material.

Figure 4:
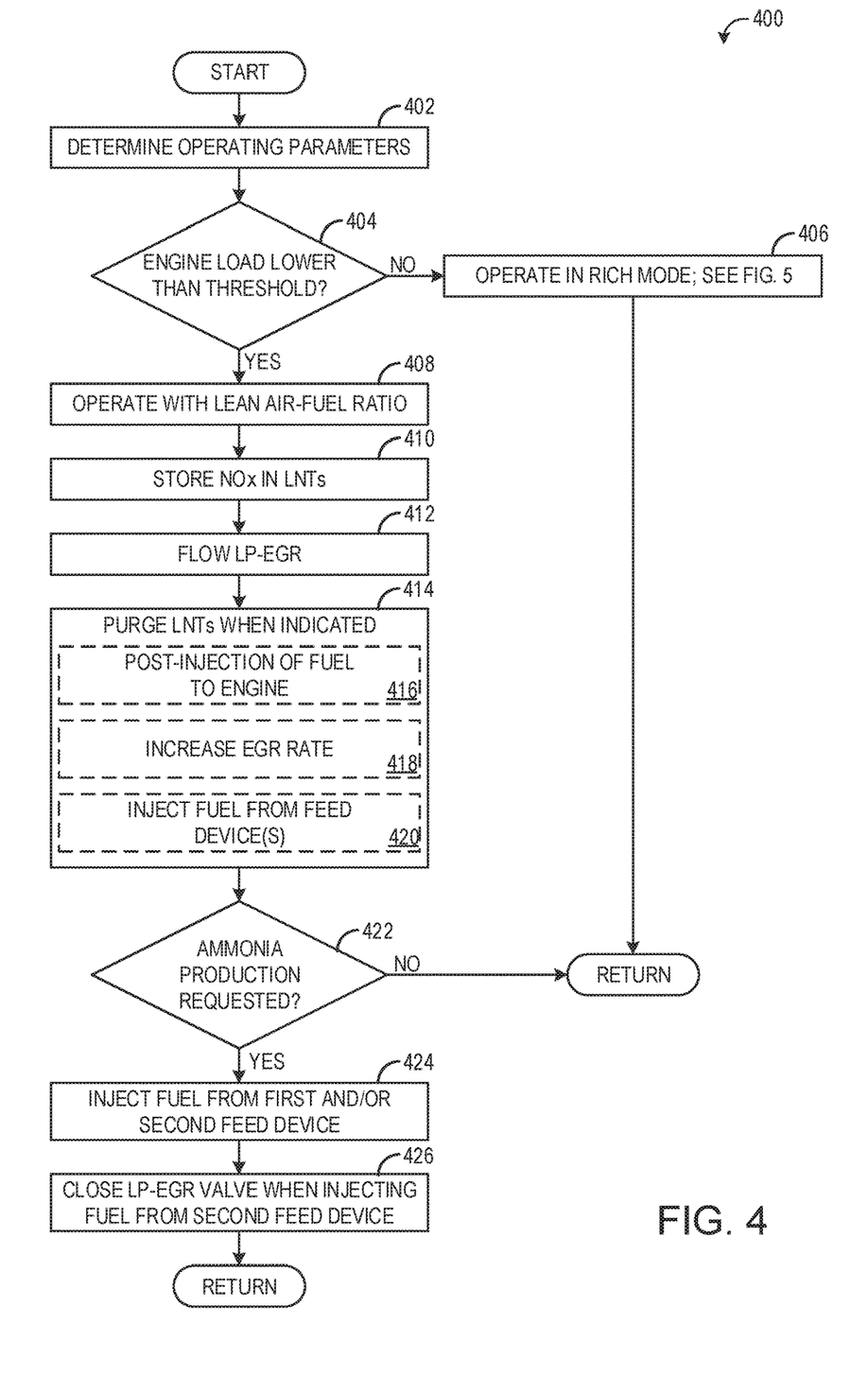
FIG. 4 is a flow chart illustrating a method for operating a vehicle.

Turning now to FIG. 4, it shows a method 400 for operating a vehicle having two LNTs and LP-EGR, such as a vehicle including the arrangement illustrated in FIG. 1 or FIG. 2. Instructions for carrying out method 400 and the rest of the methods included herein may be executed by a controller (e.g., controller 112) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, method 400 includes determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio. At 404, method 400 determines if engine load is lower than a threshold load. The threshold load may be a relatively high load, such as 60 or 75% of maximum rated load. In other examples, the method may include determining if an engine load or torque request is changing (e.g., increasing) by less than a threshold rate, such as changing by less than 10%. If the engine load is not lower than the threshold, or if load is not changing by less than the threshold rate, method 400 proceeds to 406 to operate in a rich mode, which will be explained in more detail below with respect to FIG. 5. During the rich mode, air-fuel ratio is decreased in order to meet the torque demand. Due to the resultant increased engine output, the exhaust gas temperature may increase to a temperature where the first LNT (e.g., LNT 7) is no longer able to store NOx. Thus, additional reductant may be supplied to the first LNT in order to promote conversion of NOx in the first LNT.

If engine load is lower than the threshold, or if load is changing by less than the threshold rate, method 400 proceeds to 408 to operate with a lean air-fuel ratio (or a stoichiometric air-fuel ratio, depending on engine combustion mode). During the low or moderate engine loads (e.g., when engine load is lower than the threshold), the engine may be operated with stoichiometric or above-stoichiometric air-fuel ratio to meet torque demand and maintain emissions while conserving fuel. At 410, method 400 includes storing NOx in the first and second LNTs. Due to the lean combustion, NOx may be generated in the engine. The NOx may be expelled from the engine in the exhaust gas and travel through the first LNT. The first LNT may store the NOx for later conversion. Any NOx that is not stored in the first LNT may be stored in the second LNT (e.g., LNT 10). At 412, method 400 may include flowing LP-EGR. To flow LP-EGR, the EGR valve in the LP-EGR passage (e.g., valve 9a) may be opened (e.g., fully opened or opened to an appropriate position between fully open and fully closed) to provide a target EGR amount to the engine. The LP-EGR may lower engine NOx production. LP-EGR may be supplied to the engine when engine combustion stability issues are not present. When engine combustions stability issues are present (such as when the engine is at idle), the LP-EGR valve may be closed to block LP-EGR supply to the engine.

At 414, method 400 includes purging the first and/or second LNT when indicated. Once an LNT has reached a NOx storage limit, that LNT may be purged to convert the NOx to constituent molecules (e.g., nitrogen and oxygen) that can be released to atmosphere and/or to a downstream catalyst for further conversion. An LNT purge may be indicated based on the NOx storage level of the LNT, which may be measured or estimated. To purge an LNT, the air-fuel ratio of the exhaust gas may be decreased (e.g., made rich) for a duration. In one example, the air-fuel ratio may be decreased via post-injection of fuel into the engine, as indicated at 416. Post-injection may include a secondary injection of fuel into a cylinder after the main injection (where the main injection constitutes the majority of the fuel supplied to the cylinder and results in combustion of the fuel for power generation). The post-injected fuel may be incompletely combusted, resulting in reductants available at the first LNT for purge. In another example, the air-fuel ratio may be decreased via increasing the EGR rate, as indicated at 418. For example, the LP-EGR valve may be moved to a more open position to flow more EGR to the engine, thereby decreasing the air-fuel ratio. As a further example, the air-fuel ratio may be decreased via injection of fuel into the exhaust via the first and/or second feed devices, as indicated at 420. For example, if the second LNT is to be purged, the first feed device may be activated to supply fuel to the second LNT. By providing the fuel directly to the second LNT rather than via the engine, less fuel may be used to perform the purge. In some examples, more than method for reducing the air-fuel ratio may be employed.

Further, in some examples, the mechanism selected for reducing the air-fuel ratio may depend on which LNT is being purged. As an example, if the first, upstream LNT is to be purged, post-injection of fuel to the engine may be performed. If the second, downstream LNT is to be purged, fuel may be injected directly to the exhaust tract upstream of the second LNT while continuing to operate the engine with lean air-fuel ratio. Additionally, if the first LNT is being purged, ammonia may be generated in the first LNT which may travel to the DPF and eventually to the second LNT and SCR device, passing by the junction with the LP-EGR passage along the way. To prevent supply of ammonia to the engine, LP-EGR may be disabled during purge of the first LNT. In some examples, HP-EGR may be activated during purge of the first LNT. For example, if an additional feed device is present upstream of the first LNT, reductant for purging the first LNT may be supplied by the upstream feed device, which may be positioned downstream of the HP-EGR passage. In this way, EGR may continue to flow during purge of the first LNT. In contrast, LP-EGR control may be independent of purge of the second LNT, due to the LP-EGR system branching off from the exhaust tract upstream of the feed device that supplies fuel to the second LNT.

At 422, method 400 includes determining if ammonia production has been requested. As explained earlier, the first and/or second LNT may be operated under conditions where ammonia is generated in the LNT and then released to downstream catalysts, such as an SCR or catalytically active DPF. The ammonia may be used to convert NOx in the exhaust. While an SCR device may include an external ammonia supply, at times it may be beneficial to generate the ammonia onboard via one of the LNTs. If ammonia generation is not indicated, method 400 returns. If ammonia generation is indicated, method 400 proceeds to 424 to inject fuel from the first and/or second feed device. To generate ammonia, reductant (e.g., fuel) may be supplied to an LNT. Thus, if ammonia generation from the first LNT is desired (such as LNT 7), fuel may be injected from the second feed device (such as device 14) upstream of the first LNT. If ammonia generation from the second LNT is desired (such as LNT 10), fuel may be injected from the first feed device (such as device 11) upstream of the second LNT.

At 426, method 400 optionally includes closing the LP-EGR valve when injecting fuel from the second feed device and/or when generating ammonia from the first LNT. The ammonia generated in the first LNT may travel to the engine if LP-EGR continues to flow, which may increase NOx production and/or have other deleterious effects on the engine. Thus, when ammonia is being generated from the first LNT, the LP-EGR valve may be fully closed to prevent ammonia from flowing to the engine. In some examples, when the LP-EGR valve is fully closed, EGR may be delivered from the HP-EGR system instead, and as such the HP-EGR valve may be opened as the LP-EGR valve is closed. Method 400 then returns.

Figure 5:
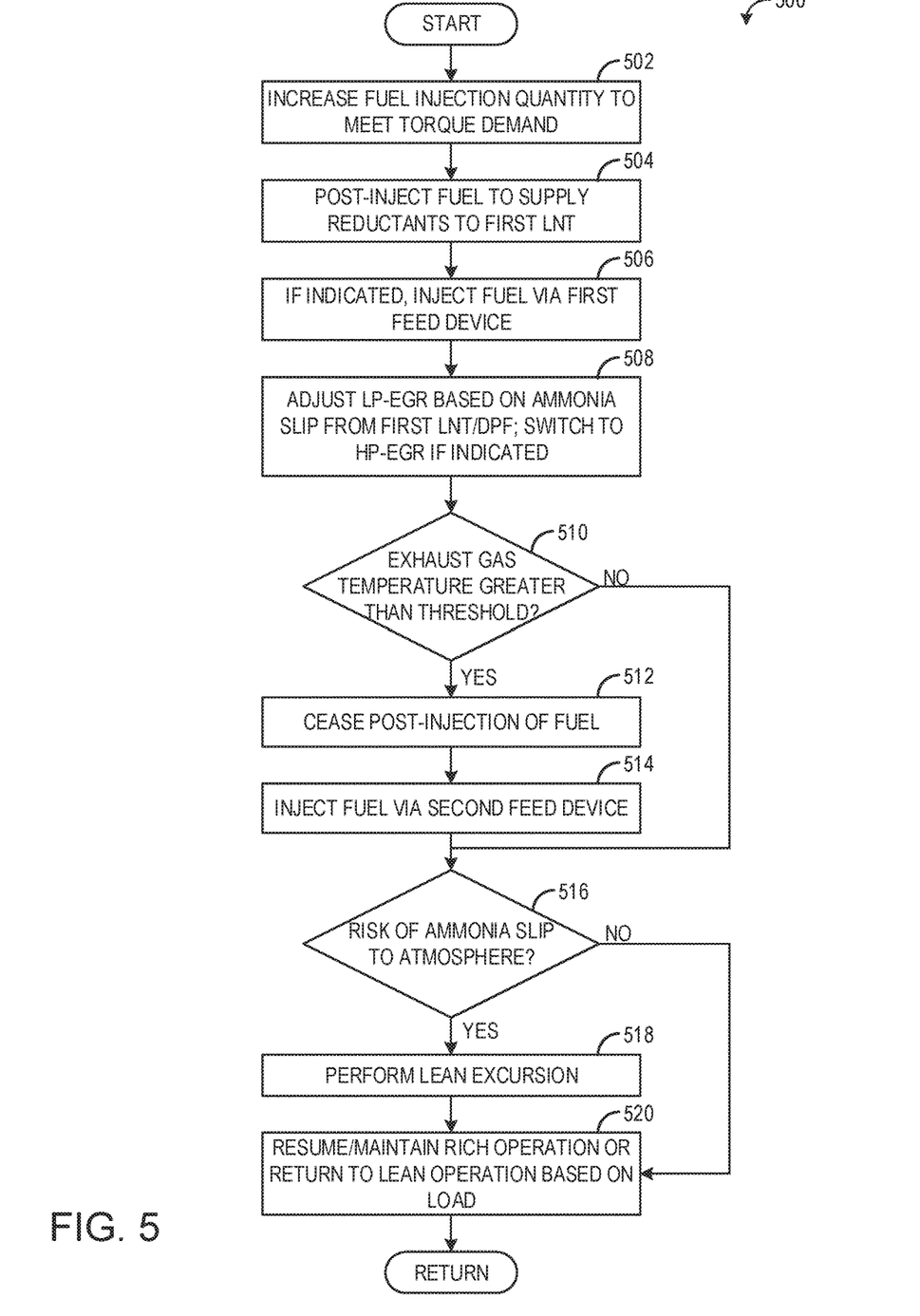
FIG. 5 is a flow chart illustrating a method for operating the vehicle during a rich mode.

FIG. 5 illustrates a method 500 for operating a vehicle in a rich mode. Method 500 may be performed as part of or subsequent to method 400, for example in response to determining that the engine load is above a threshold load or in response to determining that engine load is increasing at or above a threshold rate (e.g., in response to an operator tip-in). At 502, method 500 includes increasing the fuel injection quantity to meet the torque demand. At 504, method 500 includes post-injecting fuel to supply reductants to the first, upstream LNT (such as LNT 7). During the increased torque demand and resultant increased engine output, the temperature of the exhaust gas may increase to a temperature above which the first LNT may be able to store NOx. Thus, the first LNT may be operated to convert NOx at the LNT and prevent NOx slip. To do so, reductants may be supplied to the first LNT, via post-injection of fuel. However, in some examples, reductant may be supplied via fuel injection into the exhaust upstream of the first LNT (e.g., via second feed device 14). At 506, method 500 includes injecting fuel via the first feed device (upstream of the second LNT) when indicated. For example, the exhaust gas temperature at the second LNT may increase above a threshold temperature (e.g., 550° C.) during the rich mode. In response to the high exhaust gas temperature, the second LNT may begin to desorb stored NOx and/or be unable to store NOx in the exhaust gas. To prevent NOx slip, the second LNT may receive additional reductant so that NOx may be converted at the second LNT. At 508, method 500 includes adjusting LP-EGR based on ammonia slip from the first LNT and/or DPF. For example, if ammonia is being generated at the first LNT and not fully consumed by the DPF, ammonia may travel to the LP-EGR passage. To prevent the ammonia from being supplied to the engine, the LP-EGR valve may be closed. In some examples, HP-EGR may be activated to continue supplying EGR to the engine. The HP-EGR may supply additional heat to the exhaust, which may cause even further ammonia production at the first LNT.

At 510, method 500 includes determining if the exhaust gas temperature is greater than a threshold. The threshold may include a material limit threshold for one or more components of the exhaust tract, such as the turbine. If the exhaust gas reaches or exceeds the threshold, the turbine or other components may become degraded. Thus, if the exhaust gas temperature is greater than the threshold, method 500 proceeds to 512 to cease post-injection of fuel in order to lower exhaust gas temperature. At 514, fuel may be injected via the second feed device to continue to supply reductants to the first LNT. If the exhaust gas temperature is not greater than the threshold, method 500 proceeds to 516.

At 516, method 500 includes determining if there is a risk of ammonia slip to atmosphere. Ammonia slip to atmosphere may occur when ammonia is being generated by the first and/or second LNT and is not being consumed or stored by the SCR device downstream of the second LNT. If there is a risk of ammonia slipping to atmosphere, method 500 proceeds to 518 to perform a lean excursion. During the lean excursion, the air-fuel ratio of the engine may be increased (e.g., above stoichiometry) to reduce available reductants and cool the engine exhaust gas. At 520, method 500 includes resuming or maintaining rich operation, or returning to lean operation based on engine load. For example, if a lean excursion is performed at 518, once the exhaust gas temperature has cooled by a suitable amount, the rich mode may be resumed. The system may alternate between lean and rich modes (or remain in the rich mode as exhaust gas temperature allows) until the increased torque demand subsides, at which time the engine may resume operation in the lean mode with lean air-fuel ratio. Method 500 then returns.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An arrangement of an internal combustion engine with an exhaust tract, comprising:
    a low-pressure exhaust-gas recirculation line branching off from the exhaust tract downstream of a turbine;
    an exhaust gas aftertreatment system arranged in the exhaust tract, the exhaust gas aftertreatment system comprising:
        a first nitrogen oxide storage catalytic converter,
        a second nitrogen oxide storage catalytic converter arranged downstream of the first nitrogen oxide storage catalytic converter,
        a particle filter arranged downstream of the first nitrogen oxide storage catalytic converter and upstream of the second nitrogen oxide storage catalytic converter, and
        a first feed device for introducing fuel into the exhaust tract and arranged downstream of the branching off of the exhaust-gas recirculation line and upstream of the second nitrogen oxide storage catalytic converters;
        a second feed device for introducing fuel into the exhaust tract and arranged upstream of the first nitrogen oxide storage catalytic converter and downstream of the turbine; and
    a controller receiving information from a plurality of sensors and sending control signals to a plurality of actuators, the controller including instructions stored in memory for, during a first condition, injecting fuel from the second feed device, and adjusting a valve in the low-pressure exhaust-gas recirculation line based on the injecting of the fuel from the second feed device; and during a second condition, injecting fuel from the first feed device, and adjusting the valve in the low-pressure exhaust-gas recirculation line independent of the injecting of the fuel from the first feed device.

2. The arrangement as claimed in claim 1, wherein the second nitrogen oxide storage catalytic converter has a second catalytically active coating which is different from a first catalytically active coating of the first nitrogen oxide storage catalytic converter.

3. The arrangement as claimed in claim 2, wherein the second catalytically active coating of the second nitrogen oxide storage catalytic converter is configured relative to the first catalytically active coating of the first nitrogen oxide storage catalytic converter for nitrogen oxide conversion at high temperatures.

4. The arrangement as claimed in claim 1, wherein the first feed device for introducing fuel into the exhaust tract is a fuel injector or a vaporizer.

5. The arrangement as claimed in claim 1, further comprising a catalytic converter for selective catalytic reduction arranged downstream of the second nitrogen oxide storage catalytic converter.

6. The arrangement as claimed in claim 1, wherein the particle filter has a catalytic coating.

7. The arrangement as claimed in claim 6, wherein the coating of the particle filter is configured for selective catalytic reduction.

8. A method for a system including an engine coupled to an exhaust tract, a first lean NOx trap (LNT) coupled in the exhaust tract, and a second LNT coupled in the exhaust tract downstream of the first LNT, comprising:
    operating the engine in a lean mode and flowing exhaust gas to the engine via a low-pressure exhaust gas recirculation (LP-EGR) passage;
    while operating the engine in the lean mode and responsive to a NOx load on the second LNT exceeding a threshold load, purging the second LNT by injecting fuel to the exhaust tract upstream of the second LNT via a first feed device, and continuing to flow exhaust gas to the engine via the LP-EGR passage;
    operating the engine in a rich mode;
    while operating the engine in the rich mode, continuing to flow exhaust gas to the engine via the LP-EGR passage and injecting fuel to the exhaust tract upstream of the second LNT via the first feed device based on an exhaust gas temperature.

9. The method of claim 8, further comprising, while operating the engine in the lean mode and responsive to a NOx load on the first LNT exceeding the threshold load, reducing exhaust air-fuel ratio to purge the first LNT.

10. The method of claim 9, wherein reducing the exhaust air-fuel ratio to purge the first LNT comprises injecting fuel into the exhaust tract upstream of the first LNT via a second feed device.

11. The method of claim 10, further comprising closing a first EGR valve in the LP-EGR passage responsive to injecting fuel into the exhaust tract via the second feed device and opening a second EGR valve positioned in a high-pressure (HP) EGR passage.

12. The method of claim 8, wherein injecting fuel to the exhaust tract upstream of the second LNT via the first feed device based on the exhaust gas temperature comprises injecting fuel via the first feed device responsive to an exhaust gas temperature at the second LNT increasing to a threshold temperature.

13. The method of claim 8, wherein operating the engine in a rich mode comprises operating the engine with an exhaust air-fuel ratio lower than stoichiometry in response to an engine load demand greater than a threshold load demand.

14. A method, comprising:
    during a first condition, injecting fuel from a first fuel injector positioned in an exhaust tract upstream of a first lean NOx trap (LNT), and adjusting a valve in a low-pressure exhaust gas recirculation (LP-EGR) passage based on the injecting of the fuel from the first fuel injector; and
    during a second condition, injecting fuel from a second fuel injector positioned in the exhaust tract upstream of a second LNT, and adjusting the valve in the LP-EGR passage independent of the injecting of the fuel from the second fuel injector, the second LNT positioned downstream of the first LNT.

15. The method of claim 14, wherein the first condition comprises a purge of the first LNT and the second condition comprises a purge of the second LNT.

16. The method of claim 14, wherein adjusting the valve in the LP-EGR passage based on the injecting of the fuel from the first fuel injector comprises decreasing an opening of the valve as an amount of fuel injected from the first fuel injector increases.

17. The method of claim 14, wherein adjusting the valve in the LP-EGR passage independent of the injecting of the fuel from the second fuel injector comprises adjusting the valve in the LP-EGR passage based on a target EGR rate.

18. The method of claim 14, wherein the first condition comprises a rich mode with exhaust gas temperature at the second LNT below a threshold temperature and wherein the second condition comprises the rich mode with exhaust gas temperature at the second LNT above the threshold temperature.

* * * * *